United States Patent [19]

Paavila

[11] Patent Number: 5,613,648
[45] Date of Patent: Mar. 25, 1997

[54] CORD HOLDER

[76] Inventor: Jack Paavila, Box 1151, Alexandria, Ontario, Canada, K0C 1A0

[21] Appl. No.: 531,270

[22] Filed: Sep. 20, 1995

[51] Int. Cl.⁶ .................................................. B65H 75/38
[52] U.S. Cl. .................................... 242/405.2; 242/588.2
[58] Field of Search .................. 242/400.1, 404, 242/404.2, 404.3, 405, 405.1, 405.2, 405.3, 407, 588, 588.2

[56] References Cited

U.S. PATENT DOCUMENTS

| | | |
|---|---|---|
| 1,408,261 | 2/1922 | Brookhart . |
| 2,118,731 | 5/1938 | Knott .................................. 242/405.1 |
| 2,319,731 | 5/1943 | Garrett . |
| 2,417,587 | 3/1947 | Damstra ................................ 242/407 |
| 2,587,707 | 3/1952 | Dever .................................... 242/407 |
| 2,683,937 | 7/1954 | Criswell . |
| 3,033,487 | 5/1962 | Walker . |
| 4,721,268 | 1/1988 | Lerner et al. . |
| 4,779,816 | 10/1988 | Varlet . |
| 5,518,198 | 5/1996 | Chumbley et al. ................. 242/588.2 |

FOREIGN PATENT DOCUMENTS

WO90/01821  2/1990  WIPO .............................. 242/405.1

*Primary Examiner*—John P. Darling

[57] ABSTRACT

A compact cord holder for storing a section of electrical cord on a lamp or appliance. The holder has a spool on which the section of cord can be wound and a casing for normally covering the spool and the cord wound on it. The casing is movable to uncover the spool so that the cord can be wound on it and at the same to form a handle to hold the spool while winding the cord on it. The casing has one or more outlets for the ends of the cord wound on the spool.

19 Claims, 3 Drawing Sheets

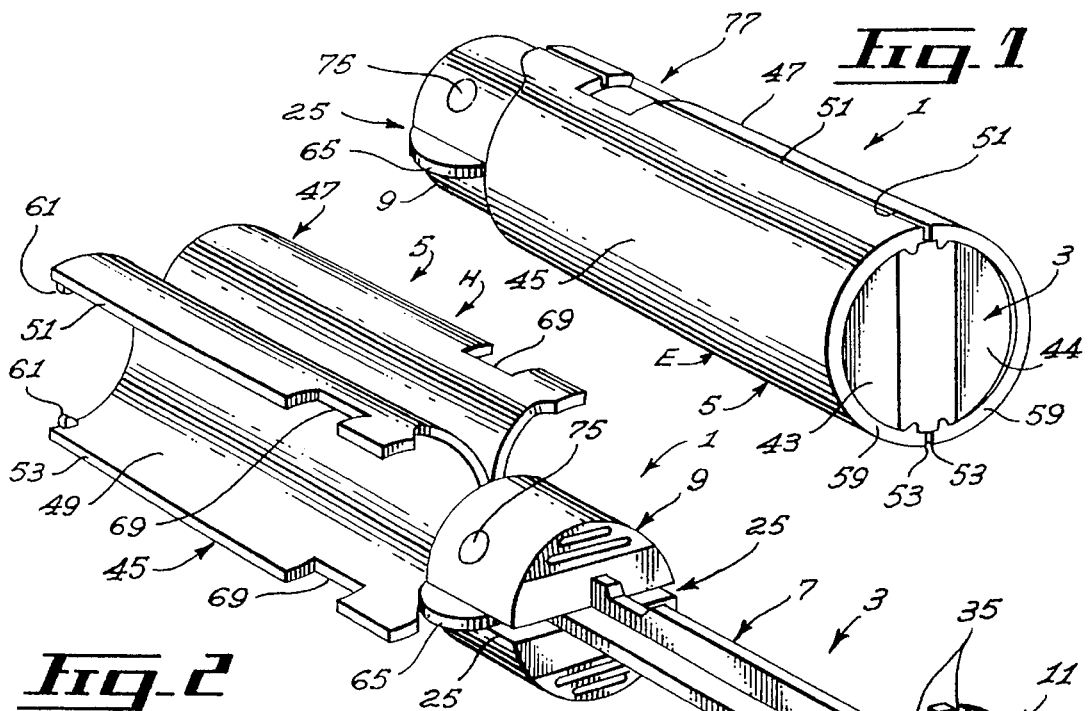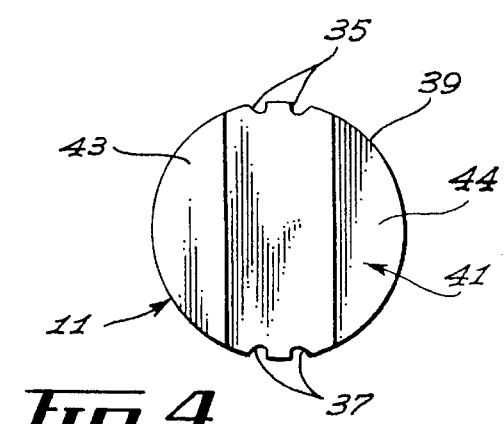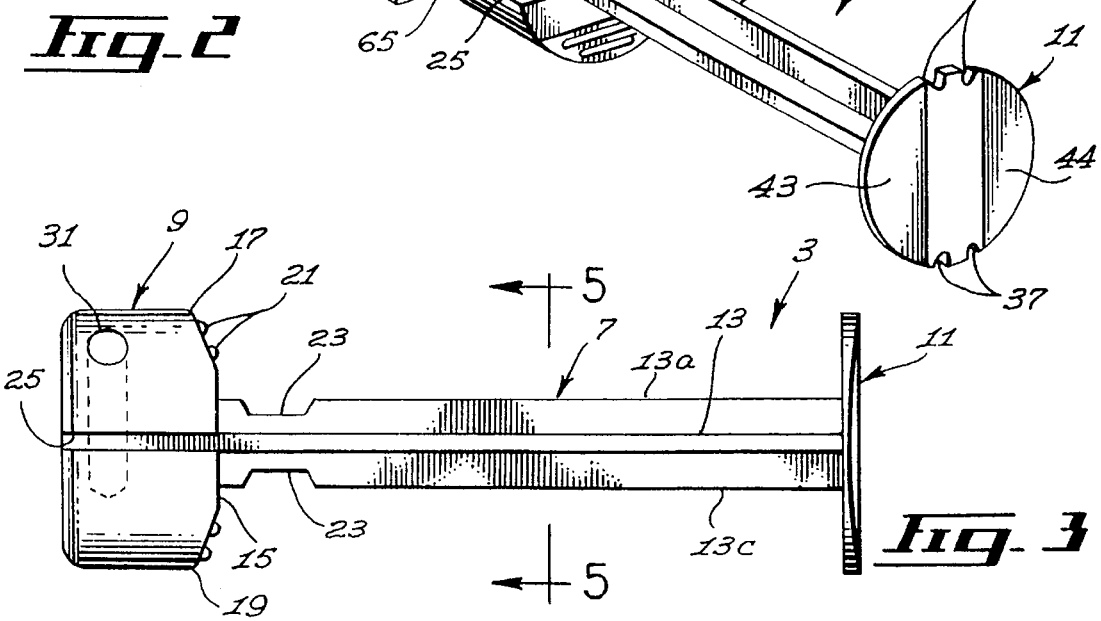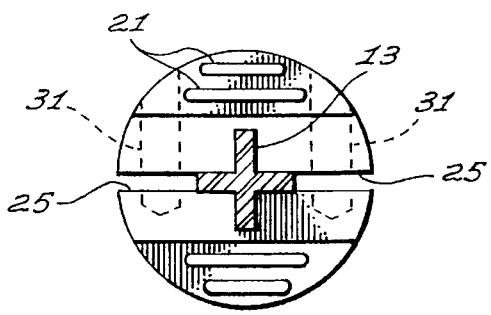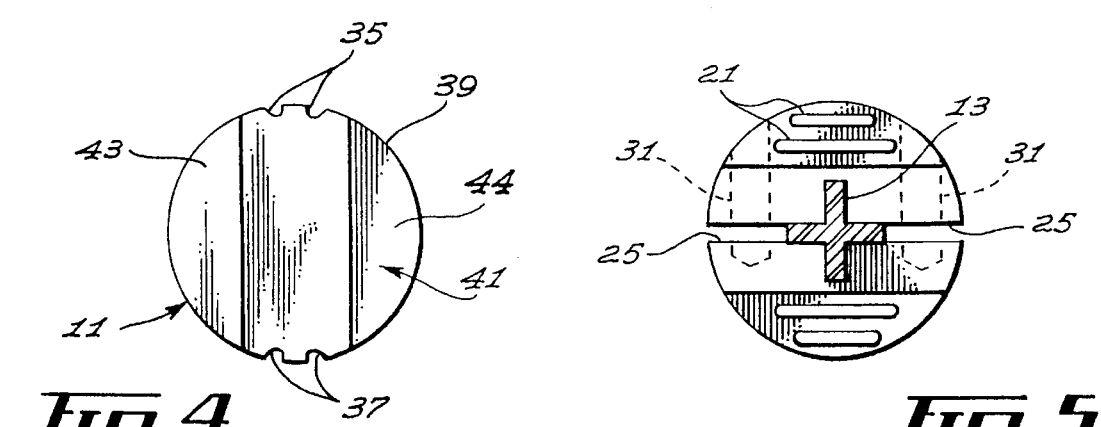

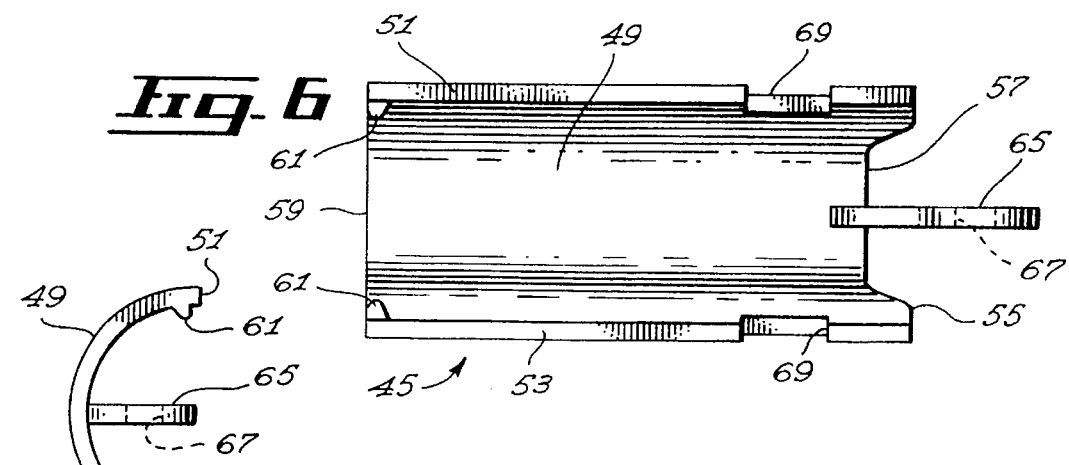
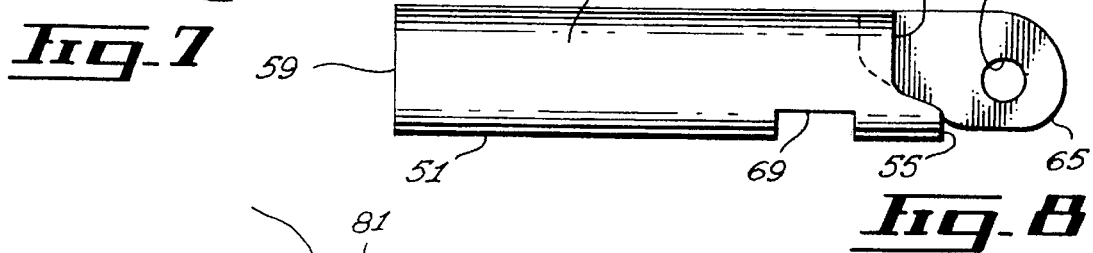
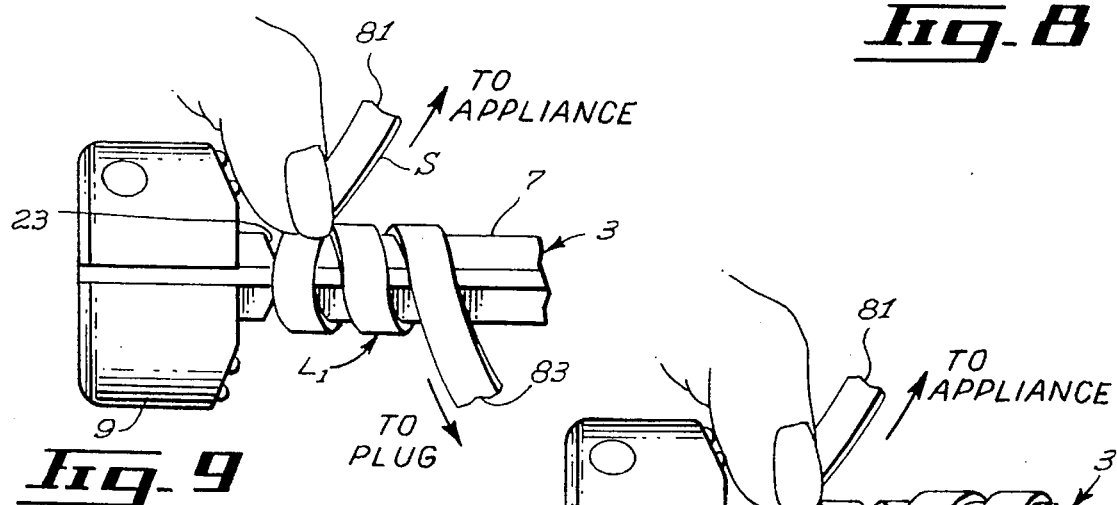
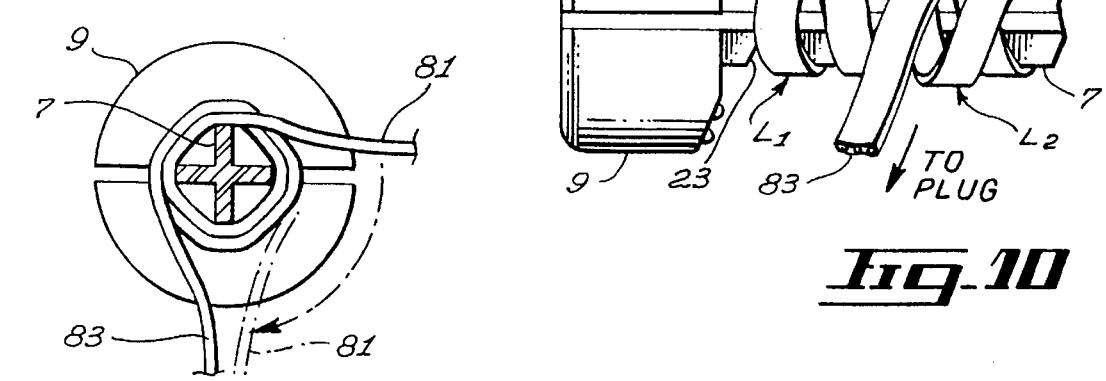

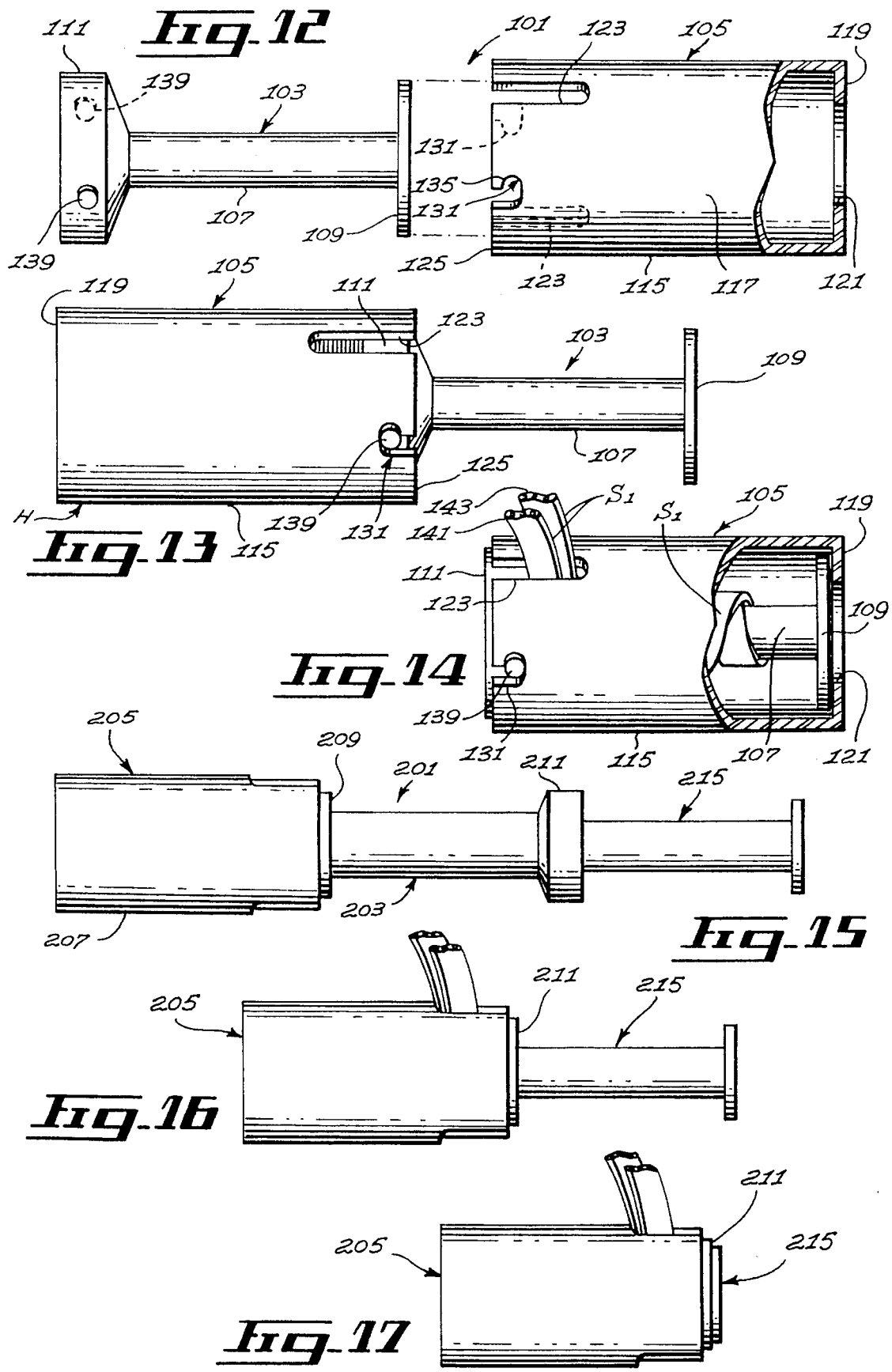

CORD HOLDER

BACKGROUND OF THE INVENTION

1. Field of the Invention

This invention is directed toward a cord holder.

The invention is more particularly directed toward a cord holder for holding a section of electric cord in storage.

2. Description of Related Art Including Information Disclosed Under 37 CFR §§1.97 and 1.98

Lamps, or household appliances such as toasters, are provided with a length of electrical cord having a plug at the end for connecting the lamp or appliance to an electrical receptacle. The electrical cord is fairly long to provide flexibility in locating the lamp or appliance in the best position both for use and for plugging it into the receptacle. Often, the best use location for the lamp or appliance is close to, or adjacent, the receptacle. In this case, a large section of the cord between the lamp or appliance, and the receptacle, is excess and lies randomly on the floor or counter. This excess cord is unsightly to some people and can be in the way when cleaning or when walking past it. The excess cord is often bundled up and tied across the bundle with a bag tie to store it compactly. However the bundle is often difficult to form and unsightly. Cord holders for winding the excess cord thereon are known as shown, for example in U.S. Pat. No. 4,721,268. However these holders are often too large and/or difficult to wind cord on.

SUMMARY OF THE INVENTION

The cord holder of the present invention is constructed to store most, or even all, of the excess length of cord in a compact space. The cord holder is also constructed to make it easy to wind cord on it. The cord holder has a spool on which the excess cord is wound and casing means to cover the wound, excess cord and to maintain it in position on the spool. The cord holder is also provided with handle means associated with the spool and movable into a position to allow the spool to be held while winding the cord onto the spool. In a preferred embodiment of the invention the casing means forms the handle means. The cord holder of the present invention is relatively simple in construction, inexpensive, and easy to use.

The invention is particularly directed toward a cord holder on which a section of electrical cord can be manually wound for storage. The holder has an elongated spool on which the section of cord is manually wound from one end of the spool toward the other end and back toward the one end. The holder also has casing means movable between a first position where it uncovers the spool so the section of cord can be wound on the spool and a second position where it covers and maintains the cord wound on the spool. The casing means has outlet means for both ends of the cord wound on the spool, the outlet means located near the one end of the spool when the casing means is in the second position. The holder also has handle means movable between a first position to allow the spool to be held while winding the section of cord on it, and a second storage position.

The invention is more particularly directed toward a cord holder on which a section of electrical cord can be manually wound for storage, the holder having an elongated spool on which the section of cord is manually wound from one end of the spool toward the other end and back toward the one end. The holder also has casing means. The casing means are movable between a first position, where it uncovers the spool so the section of cord can be wound on the spool and also where it forms a handle at one end of the spool to allow the spool to be held while winding the cord on it, and a second position where it substantially covers the cord wound on the spool to maintain the cord in position on the spool. The casing means has outlet means for both ends of the cord wound on the spool, the outlet means located near the one end of the spool when the casing means is in the second position.

BRIEF DESCRIPTION OF THE DRAWINGS

FIG. 1 is a perspective view of the cord holder in a closed position;

FIG. 2 is a perspective view of the cord holder in an open position;

FIG. 3 is a side view of the spool used in the cord holder;

FIG. 4 is a front view of the spool;

FIG. 5 is a cross-section view taken along line 5—5 in FIG. 3;

FIG. 6 is a side view of a cover used in the cord holder;

FIG. 7 is a front view of the cover;

FIG. 8 is a top view of the cover;

FIGS. 9 to 11 are views showing the cord being wound on the holder;

FIG. 12 is an exploded, side view of another embodiment of the cord holder, in partial section;

FIG. 13 is a side view of the holder of FIG. 12 in position for cord winding;

FIG. 14 is a side view of the holder of FIG. 12, in partial section, when cord is stored on it:

FIG. 15 is a side view of a further embodiment of the cord holder;

FIG. 16 is a side view showing the holder of FIG. 15 partially assembled after cord winding; and FIG. 17 is a side view of the holder of FIG. 15 fully assembled after winding.

DESCRIPTION OF THE PREFERRED EMBODIMENTS

The holder 1 of the present invention, as shown in FIGS. 1 and 2, has an elongate spool 3 and a casing means 5. The spool 3, as shown in FIGS. 3 to 5, has a central core 7 on which a section of electrical cord can be wound as will be described. The core 7 extends between a short, generally cylindrical, base 9 at one end and a circular end wall 11 at the other end. The core 7 can comprise four, radially extending ribs 13, spaced apart ninety degrees, which are joined together at their inner sides to form the core. The ribs 13 provide the core 7 with a cross-shaped cross-section as seen in FIG. 5. The inner end 15 of the base 9, from which the core 7 extends, preferably has opposed surfaces 17, 19 on opposite sides of the core 7 which slope slightly away from the core 7. Raised ribs 21 can be provided on the surfaces 17, 19 to provide a grip as will be described. Two opposed ribs 13a and 13c of the core 7 can each have a shallow cutout 23 adjacent the surfaces 17, 19 for receiving and locating the cord as will be described.

A connecting slot 25 is provided on each side of the base 9. The slots 25 are in the center of the base 9 extending inwardly toward each other and are generally parallel with the longitudinal axis of the core 7. A blind hole 31, as shown by dotted lines in FIG. 5, extends down from the top of the base 9, transverse to, and through each slot 25.

The end wall 11 has a pair of top, adjacent depressions 35 and a pair of bottom, adjacent depressions 37 in its outer edge 39. The depressions 35, 37 are used to hold the casing means 5 as will be described. The front face 41 of the end wall 11 can be beveled back toward each side from a central area providing slightly slanting surfaces 43, 44, the purpose of which will be described.

The casing means 5 comprises a pair of semi-cylindrical, tubular covers 45, 47. The covers 45, 47 are identical so only one will be described in detail. Cover 45, as shown in FIGS. 6 to 8, has a curved main wall 49 with parallel long sides 51, 53. A central portion of the inner end 55 of the wall 49 is cut back slightly as shown at 57. Adjacent the outer end 59 of the main wall 49, and adjacent each long side 51, 53 there is a small inwardly directed protuberance 61. A connecting flange 65 extends inwardly and rearwardly from the main wall 49 adjacent its inner end 55. The flange 65 is centrally located between the long sides 51, 53 and is parallel to them. A central hole 67 is provided in the flange 65. A cutout 69 is provided in each long side 51, 53 of the wall 49 adjacent its inner end 55. The cutouts 69 form cord outlet openings when the long sides 51, 53 of the covers 45, 47 abut as will be described.

The cord holder 1 is assembled by inserting the flanges 65 of the covers 45, 47 into the slots 25 in the base 9 of the spool 3 and passing a pin 75 into each blind hole 31 and through the hole 67 in the flange 65 in the slot 25 to rotatably mount the covers 45, 47 onto the spool 3. Suitable means, not shown, lock the pins 75 in place. While one means for connecting the covers 45, 47 to the base 9 has been described, other means can be employed.

When the cord holder 1 is not in use, the covers 45, 47 are pivoted about the pins 75 on the base 9 to have their long sides 51, 53 abut over the spool 3 as shown in FIG. 1. The protuberances 61 on the covers 45, 47 snap into the depressions 33, 35 on the end wall 11 of the spool 3 to hold the covers 45, 47 abutting. The covers are made of slightly resilient material to allow this. When abutting, the covers 45, 47 form a cylindrical, tubular enclosure E for the spool 3 with the cutouts 69 forming outlet openings 77 for the cord wound on the spool. The outlet openings 77 are adjacent the base 9 of the spool 3.

When the cord holder 1 is to be used to hold a length S of electrical cord, the covers 45, 47 are pivoted away from each other around the pins 75 on the base 9 until the back of their main walls 49 abut behind the base 9 forming a handle H as shown in FIG. 2. The cutback portion 57 on the inner end 55 of the wall 49 allows the covers to clear the rear of the base 9. The outer end 59 of the covers 45, 47 can be gripped by the finger tips to pivot them away from the end wall 11, and from each other, because of the slanting surfaces 43, 44 on the end wall 11. A portion of the outer end 59 projects past the surfaces 43, 44 providing a finger hold. A good grip is needed to move the protuberances 61 out of the depressions 35, 37 in the end wall 11. A section S of electrical cord is now placed across the core 7 of the exposed spool 3 adjacent the base 9 in one of the cutouts 23 on one of the ribs 13a, 13c as shown in FIG. 9. The cord can be placed in either cutout 23. One end 81 of the cord leads to an appliance or lamp and the other end 83 of the cord leads to a plug. A thumb of one hand rests against one of the sloping surfaces 17, 19, directed by the surface toward the cutout, and holds the cord length S in the cutout 23 on the rib adjacent the base 9. The fingers of the one hand also grasp the handle H to hold the spool. The other hand of the user now spirally winds the cord on the spool 3 in one layer L1 toward the end wall 11 and then back again toward the base 9 in a second layer L2 on top of the first layer L1, as shown in FIG. 10, to wind a desired length of the cord section S onto the spool. Then, moving one or both ends 81, 83 of the cord to abut them, and positioning the abutted ends over one of the slots 23, the cord ends are held together adjacent the base 9 with the winding hand, as shown in FIG. 11, and the user rotates the covers 45, 47 about the base 9 with the other hand to substantially enclose the spool 3, retaining the section S of cord wound on the spool in place. The protuberances 61 on the free ends of the covers 45, 47 snap into the depressions 35, 37 on the end wall 11 of the spool to hold the covers closed. The ends 81, 83 of the cord, adjacent the base 9, extend out through one of the openings 77 formed by the cutouts 69 in the covers. One end 81 of the cord leads to the lamp or appliance and the other end 83 of the cord leads to the plug at the end of the cord. Usually, it is the end 83 of the cord having the plug that is wound onto the spool since this allows the cord to more easily untwist while being spirally wound on the spool.

The holder is easy to use and compact. It can hold a surprising amount of excess cord. A holder approximately two and one half inches long and one inch in diameter can hold up to four feet of standard lamp cord. The holder can, of course, hold less cord than its capacity. Cord can be wound only part way on the core in one layer toward the end wall and then returned to the base in a second layer. The covers, in a closed position, prevent the cord from unwinding or sliding along the core. The covers are sized to provide some clearance between the two layers of wound cord and the covers to allow for some uneven or loose winding. While a holder with a circular cross section has been described, the holder could also be made with a square cross-section.

The holder could have other forms as well. In another embodiment of the invention, as shown in FIGS. 12 to 14, the cord holder 101 could have a spool 103 and a casing means 105. The spool 103 has a core 107 with a circular end wall 109 at one end and a short, cylindrical, base 111 at the other end of the spool. The casing means 105 in this embodiment comprises a single tubular cover 115 having a cylindrical wall 117 with an end wall 119 at one end. The end wall 119 has a large, central, circular hole 121 in it. A pair of diametrically opposed cord slots 123 extend inwardly from the other end 125 of the cover 115. Two connector slots 131 also extend inwardly from the other end 125 of the cover 115. The connector slots 131 have a short transverse slot portion 135 at their bottom ends to form a bayonet slot. The base 111 has two diametrically opposed pins 139 on its cylindrical surface.

In using the holder 101, the tubular cover 115 normally covers the spool 103 with its end wall 119 abutting the end wall 109 of the spool 103. The connector slots 131 receive the pins 139 on the base 111. Suitable holding means, such as protuberances on one of the spool and cover and small depressions on the other of the spool and cover (not shown) hold the cover 115 on the spool 103. When the a length of cord is to be wound onto the spool, the cover 115 is removed by pushing against the end wall 109 of the spool 103 through the hole 121 in the end wall 119 of the cover 115. The cover is then mounted onto the base 111 of the spool 103 from the other end of the spool to form a handle H for the spool as shown in FIG. 13. The slots 131 receive the pins 139 on the base 111 and the cover 115 can be rotated slightly to lock the cover 115 to the base 111 via the bayonet slots 131. While the spool 103 is held, via the handle H, by one hand, the cord length S1 is wound onto the spool by the other hand in two layers as before, moving away from the base in a first spiral layer and returning toward the base in a second spiral layer. When the desired amount of cord has been wound onto the spool, the ends 141, 143 of the cord are grasped, the cover 115 is removed from the base 111 and mounted onto the spool 103 from the other end to cover the spool 103 and the cord S1 wound on it. As the cover 115 is moved over the spool toward the base 111 the ends 141, 143 of the cord S1 are located in a cord slot 123 on the cover.

In both embodiments described above, the casing means 5, 105 forms a handle H for the spool 3, 103 when it is located in a different position from the position where it covers the spool. A cord holder could also be provided with a separate handle if desired. As shown in FIGS. 15 to 17 a cord holder 201 could be provided having a spool 203 and casing means 205 in the form of a cylindrical cover 207 that can slide nearly off the spool 203 at one end 209 of the spool away from the base 211. Suitable means (not shown) can be provided on the cover 207 and the spool 209 for preventing the cover 207 from separating from the spool 209 when it is slid off to one side, and, on the cover 207 and base 211, for locking the cover 207 onto the spool 209 when it covers the spool. A separate handle 215 is mounted within the spool 203. The handle 215 can slide out from within the spool 209 from the base end of the spool when it is desired to wind cord onto the spool. The handle 215, in its operative position, is held by one hand while cord is wound onto the spool with the other hand moving away from the base of the spool and the handle in one layer and returning in a second, top layer. Suitable means (not shown) can be provided for preventing the spool from rotating relative to the handle when winding the cord on the spool. When the desired amount of cord has been wound onto the spool 203, the cover 207 is slid back to cover the spool and the wound cord with the ends of the cord passing through a cord slot 217 on the cover. The handle 215 is pushed back into the spool for storage. In this embodiment, both the cover and the spool can have slightly larger diameters and the spool can be tubular to store the handle. Suitable means (not shown) hold the handle in the storage position within the spool.

If desired, the casing means in any embodiment can be provided with one or more flat areas on its outer tubular surface. An adhesive strip, or the like, can be applied to the flat area for use in fastening the holder to the appliance, to a wall, or the like, if desired.

While the holder has been described for use with a lamp or appliance cord, it is obvious that it can be used with other similar cords such as phone cords, tool cords or the like. The holder can be made in various sizes to hold various amounts of cord.

While the disclosure refers to the top, bottom, front, etc. of the holder, this is only for the purpose of locating the elements of the holder with respect to each other having reference to the drawings. It is obvious that the holder, in use, can be used in any attitude.

I claim:

1. A cord holder on which a section of electrical cord can be manually wound for storage, the holder having: an elongated spool of fixed length on which the section of cord can be manually wound; casing means, the casing means movable relative to the spool between a first position where it substantially uncovers the spool so the section of cord can be wound on the spool, and a second position where it covers and maintains the cord wound on the spool; the casing means having outlet means for both ends of the cord wound on the spool, and handle means, the handle means movable between a first position to be grasped to allow the spool to be held while winding a section of cord on it, and a second storage position.

2. A cord holder as claimed in claim 1 wherein the casing means and the handle means are the same structure means, the structural means performing the functions of the handle means in the first position and the functions of the casing means in the second position.

3. A cord holder as claimed in claim 2 wherein the casing means comprises a tubular cover that can be moved longitudinally relative to the spool between the first position, where the cover forms the handle means, and the second position.

4. A cord holder as claimed in claim 2 wherein the casing means comprises a tubular cover that can be removed from one end of the spool, and mounting means on the spool and cover for mounting the cover on the other end of the spool in the first position to form the handle means.

5. A cord holder as claimed in claim 2 wherein the casing means comprises two covers that together form a tubular enclosure for the spool and any length of cord wound on the spool.

6. A cord holder as claimed in claim 5 wherein the two covers are pivotably mounted on a base at one end of the spool, the covers movable between a face-to-face position forming an enclosure and a back-to-back position forming handle means that is an extension of the spool.

7. A cord holder as claimed in claim 6 including cooperating means on the spool and covers for maintaining the covers in face-to-face position.

8. A cord holder as claimed in claim 6 including cutouts in the sides of the covers adjacent the base of the spool, the cutouts forming cord outlets when the covers are face-to-face.

9. A cord holder as claimed in claim 6 including opposed sloping surfaces on the front of the base for use in locating the user's thumb to hold the cord on the spool when starting winding.

10. A cord holder as claimed in claim 1 wherein the handle means comprises a handle slidably mounted within the spool for movement between a storage position within the spool and a use position outside, and aligned with, the spool.

11. A cord holder on which a section of electrical cord can be manually wound for storage, the holder having: an elongated spool on which the section of cord can be manually wound from one end of the spool toward the other end and back toward the one end; and casing means, the casing means mounted on one end of the spool and movable between a first position where it uncovers the spool so the section of cord can be wound on the spool and where it simultaneously forms a handle extending from the one end of the spool to allow the spool to be held while winding the cord on it, and a second position where the casing means substantially covers the spool and the section of cord wound on it; the casing means having outlet means for both ends of the cord wound on the spool, the outlet means located near the one end of the spool when the casing means is in the second position.

12. A cord holder as claimed in claim 11 wherein the casing means comprises two elongate covers each pivotably mounted on a base at one end of the spool along an axis that is transverse to the long axis of the spool, the covers abutting each other front to front in the second position to form an enclosure and abutting each other back to back in the first position to form the handle.

13. A cord holder as claimed in claim 12 wherein each cover has parallel, long side edges and wherein there is a cutout in each long side edge of each cover adjacent the base of the spool, opposing cutouts on the covers forming the outlet means for the cord ends when the covers form an enclosure.

14. A cord holder as claimed in claim 12 wherein the spool has an end wall and cooperating means are provided on the end wall and the covers to hold the covers closed forming the enclosure.

15. A cord holder as claimed in claim 14 wherein the surface of the base facing the end wall is sloped on opposing sides of the spool to form a resting surface for the user's thumb so as to be able to hold the cord on the spool when starting to wind it on the spool.

16. A cord holder as claimed in claim 14 wherein the end wall has an outer surface and the outer surface of the end wall is sloped back to each side to allow the ends of the covers to overhang the end wall when the covers are in the second position thereby allowing the ends of the covers to be gripped to move the covers to the first position.

17. A cord holder on which a section of electrical cord can be manually wound for storage, the holder having: an elongated spool of fixed length on which the section of cord can be manually wound; and casing means, the casing means mounted on one end of the spool and movable relative to the spool between a first position where it substantially uncovers the spool so the section of cord can be wound on the spool and where it simultaneously forms a handle extending from the one end of the spool to allow the spool to be held while winding the cord on it, and a second position where the casing means substantially covers the spool and the section of cord wound on it; the casing means having outlet means for both ends of the cord wound on the spool.

18. A cord holder as claimed in claim 17 wherein the casing means comprises two elongate covers each pivotably mounted on a base at one end of the spool along an axis that is transverse to the long axis of the spool, the covers abutting each other front to front in the second position to form an enclosure and abutting each other back to back in the first position to form the handle.

19. A cord holder as claimed in claim 18 wherein the spool has an end wall and cooperating means are provided on the end wall and the covers to hold the covers closed forming the enclosure.

* * * * *